United States Patent

Miyaoka

[11] 4,051,529
[45] Sept. 27, 1977

[54] FOCUS CONTROL SYSTEM WITH MOVABLE MIRROR

[75] Inventor: Senri Miyaoka, Zushi, Japan

[73] Assignee: Sony Corporation, Tokyo, Japan

[21] Appl. No.: 696,830

[22] Filed: June 15, 1976

[30] Foreign Application Priority Data

June 19, 1975 Japan ............................ 50-74659

[51] Int. Cl.$^2$ .......................... H04N 5/76; G11B 7/12
[52] U.S. Cl. ........................... 358/128; 179/100.3 V
[58] Field of Search ............... 179/100.3 V; 358/127, 358/128; 250/201, 555, 566, 568, 570, 578; 340/173 LM, 173 LT

[56] References Cited

U.S. PATENT DOCUMENTS

| 3,673,412 | 6/1972 | Olson | 250/201 |
| 3,873,763 | 3/1975 | Janssen | 179/100.3 V |

FOREIGN PATENT DOCUMENTS

| 2,436,395 | 2/1975 | Germany | 179/100.3 V |

*Primary Examiner*—Raymond F. Cardillo, Jr.
*Attorney, Agent, or Firm*—Lewis H. Eslinger; Alvin Sinderbrand

[57] ABSTRACT

A focus control system for an optical record carrier in which a light beam is reflected by a movable mirror through one objective lens and then directed to the carrier through another objective lens so that the light beam remains focused on the record carrier in spite of fluctuations of the carrier.

12 Claims, 3 Drawing Figures

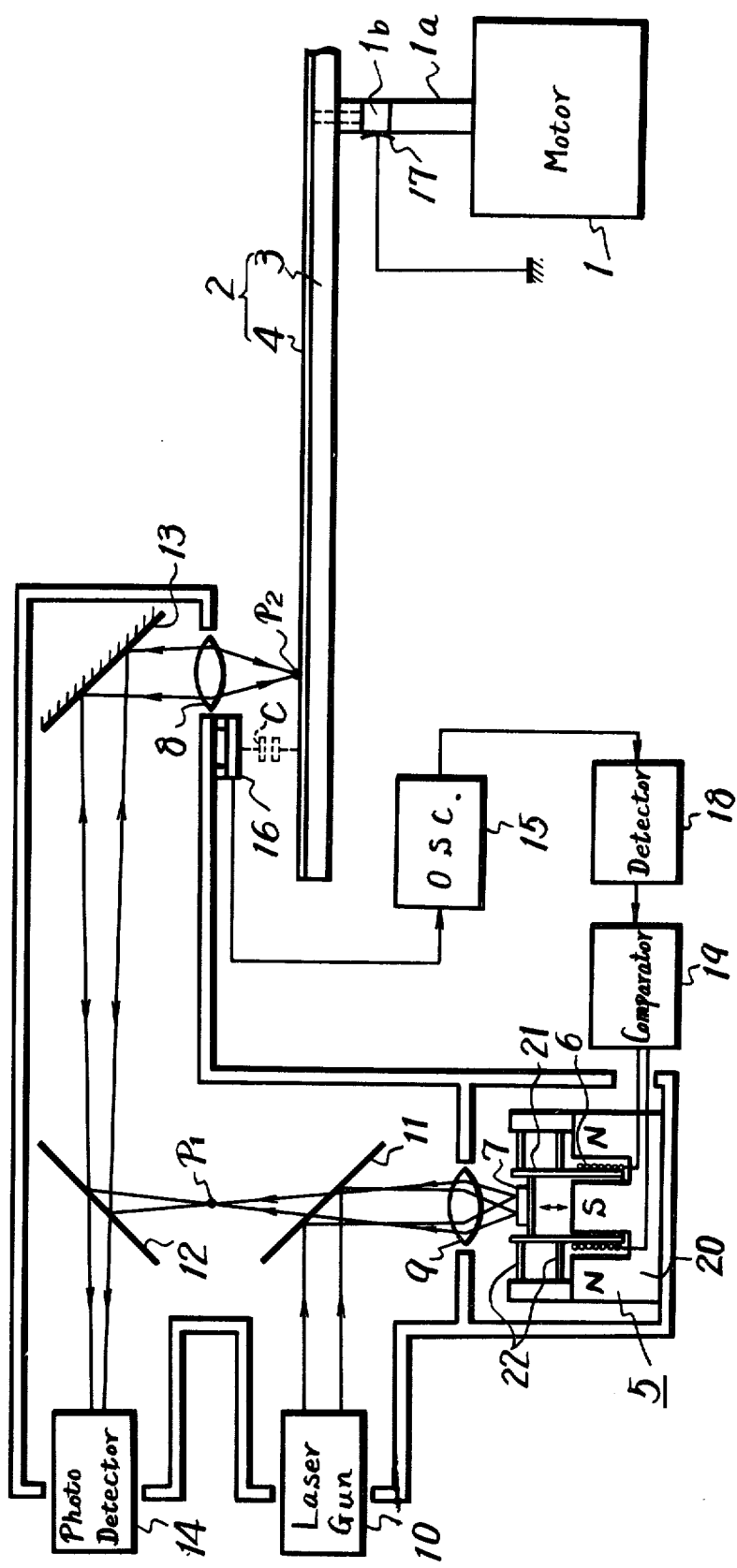

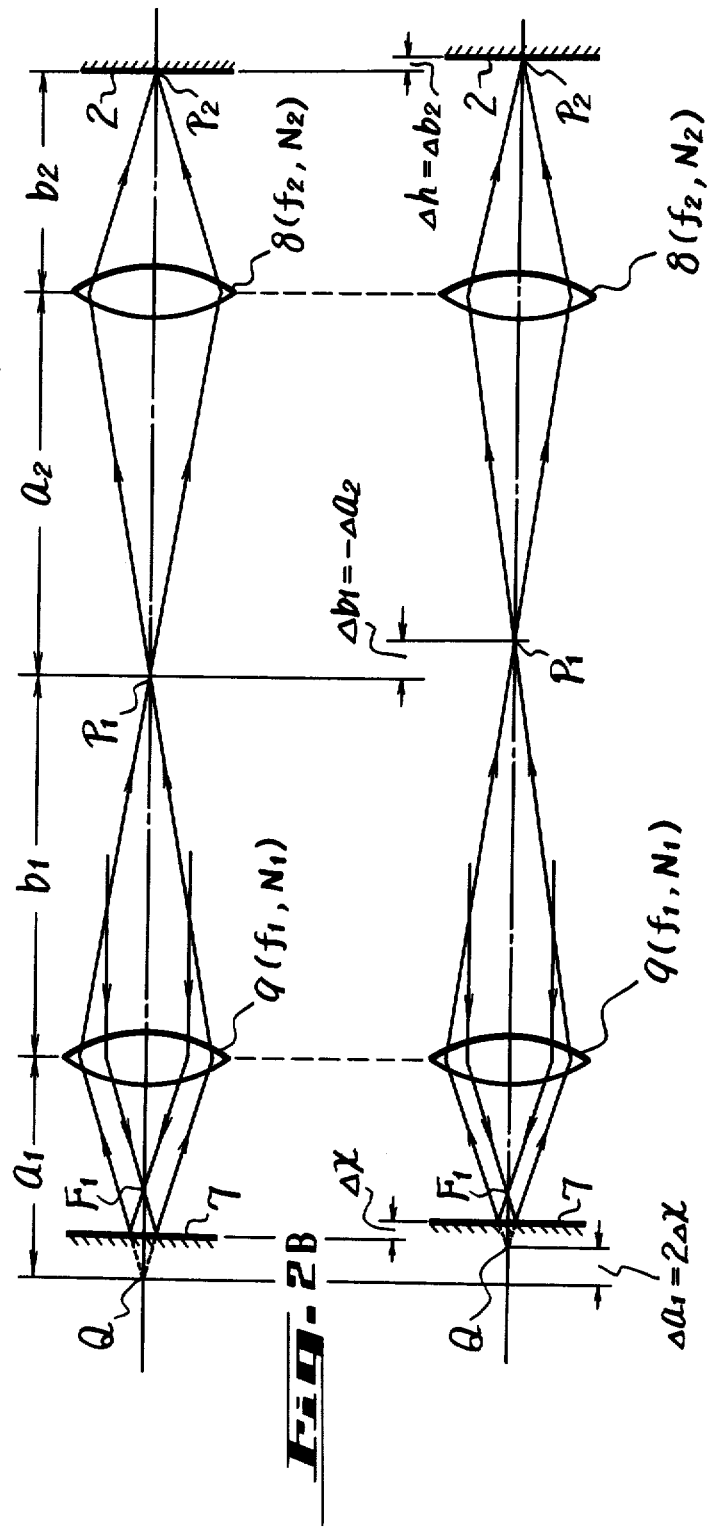

FOCUS CONTROL SYSTEM WITH MOVABLE MIRROR

BACKGROUND OF THE INVENTION

1. Field of the Invention

This invention relates generally to a focus control system and, more particularly, to a focus control system for an optical record carrier in which a light beam for recording or reproducing must remain focused on the carrier in spite of the fluctuation of the carrier.

2. Description of the Prior Art

It has been proposed in the art to record and reproduce signals optically, for example, to record a video signal on a flat record carrier and to reproduce a video signal previously recorded on such a carrier, the recording and the reproduction each being accomplished by means of a light beam scanning the surface of the flat record carrier.

In a system for such an optical recording or reproducing as mentioned above, it is required, for recording or reproducing signals accurately, that the light beam which scans the record carrier always be in the proper focus condition, for example, the condition of being in focus on the surface of the record carrier without being influenced by deviations of the carrier from a predetermined position.

However, if a rotatable disc is employed as the flat record carrier and its surface is used for recording signals as usual, and if the surface of the rotating disc is inclined in relation to its axis of rotation or if the surface of the rotating disc moves along the axis for rotation through the influence of the rotation of the disc, even though such an inclination or movement is usually present to a certain degree in practical systems, the space between the surface of the disc and an objective lens provided for focusing the scanning light beam on the surface of the disc would vary, which is undesirable. As a result, the scanning light beam can not always maintain the proper focus condition on the surface of the disc.

To compensate for deteriorations in the focus condition of the scanning light beam due to the causes just described, it has been proposed in the prior art systems to detect the instantaneous position of the surface of the rotating disc and, in response to the detected information, to move the lens to maintain a predetermined space between the surface of the disc and the lens so as to keep the scanning light beam always in the proper focus condition on the surface of the rotating disc. However, it is difficult for the servomechanism of the proposed system to follow quick variations in the space with fidelity because the objective lens whose mass is relatively large can not be moved quickly and accurately enough. Therefore, the compensation is not done adequately.

There has been another proposal to keep the space between the objective lens and the carrier constant: It is to run the carrier between sliders in order to stabilize the fluctuation of the carrier aero-dynamically. However, it is impossible to eliminate fluctuations of the carrier completely.

Another previous proposal to avoid the deteriorations in the focus condition of the scanning light beam is to install the rotatable disc so that its surface is perfectly perpendicular to its axis of rotation and to prevent the surface of the rotating disc from having any movement in the direction of the axis for rotation. This proposal, however, is impossible to obtain in any practical system.

Accordingly, the prior art systems have not accomplished sufficient compensation or avoidance of the deteriorations in the focus condition of the light beam scanning the rotating disc.

OBJECT AND SUMMARY OF THE INVENTION

It is an object of the present invention to eliminate the above described disadvantages inherent in the prior art systems and to provide a focus control system in which a light beam can be kept in proper focus on the recording surface of a carrier, in spite of the deviations in position of the carrier, without moving the objective lens.

Further, another object of the present invention is to provide an improved optical system which can be used for recording or reproducing a video signal on a rotatable disc by means of a light beam.

In accordance with the present invention, a focus control system is provided for an optical device that can record or reproduce a signal on a carrier optically. The light beams, either to record or to reproduce, are kept focused on the reflective surface of the signal carrier, in spite of fluctuations thereof, by a movable mirror located in the optical path between a light beam source and the signal carrier so that the movement of the mirror can compensate for the in focus caused by fluctuations of the carrier.

BRIEF DESCRIPTION OF THE DRAWINGS

FIG. 1 is a schematic diagram showing one embodiment of a focus control system according to the present invention.

FIGS. 2A and 2B are optical diagrams used for explaining the focus control of the system according to the invention shown in FIG. 1.

DESCRIPTION OF THE PREFERRED EMBODIMENT

FIG. 1 shows one embodiment of the focus control system of the invention used for reproducing a video signal. In FIG. 1 motor 1 has a rotating shaft 1a attached to a disc-shaped recording medium 2. This recording medium 2 includes a base plate 3 made of resin, one surface of which is used as a recording surface. A signal is recorded on this recording surface as a pit, and a reflective layer 4 of metal is coated on the recording surface.

The system includes a movable mirror assembly 5 composed of a permanent magnet 20 with an annular gap. The inner part of the magnet surrounded by the gap is partially used as one pole, the outer part surrounding the gap is the opposite pole, and a movable coil 6 wound on a movable coil form 21 is inserted into the gap. A mirror 7 is mounted on the coil 21, and a spring 22 supports the coil form. When the current flowing in the coil 6 changes, the Lorentz force along the axis of a reading beam is applied to the coil 6, and hence the mirror 7 is moved in the direction perpendicular to its surface, as shown by an arrow.

A first lens system 8 is provided in opposed relation to the reflective layer 4 of the recording medium 2, and a second lens system 9 is provided in opposed relation to the reflective surface of the mirror 7. The first and second lens systems 8 and 9 are designed to have a shallow depth of focus.

For example, the parallel laser light or light beam from a laser gun 10 is reflected by a half-silvered, or semi-transparent mirror 11 onto the mirror 7 through the second lens system 9. The light beam reflected from the mirror 7 is also reflected through the second lens system 9 and the semi-transparent mirror 11 onto another semi-transparent mirror 12 from which it is reflected on a mirror 13. The latter reflects the beam through the first lens system 8 and onto the reflective layer 4. Light reflected by the reflective layer 4 passes back through the first lens system 8, is reflected by the mirror 13 and passes through the semi-transparent mirror 12 to a light detecting element, or photo-detector, 14, which detects change in the amount of the reflected light on the reflective layer 4. Thus, the detected light is converted into a corresponding electric signal by the photo-detector 14 and hence the video signal recorded on the surface of the recording medium 2 is reproduced. In this case, the lens systems 8 and 9 are so selected in position that an intermediate image is formed at a point $P_1$ between the semi-transparent mirrors 11 and 12.

In order to make sure that, even if the recording medium 2 fluctuates, or moves up and down, a constant focus condition is obtained on the recording suface of the recording medium 2, the illustrated example of the invention includes an oscillator 15 and an electrode 16 located near the first lens system 8. In addition, a part $1b$ of the rotating shaft $1a$ of the motor 1 is made of conductive material $1b$ grounded through a slip spring 17 and connected to the layer 4 to ground the reflective layer 4 of the recording medium 2. The oscillation frequency of the oscillator 15 is determined by a capacity C which depends upon the distance between the electrode 16 and the reflective layer 4 or ground, and the oscillation signal from the oscillator 15 is supplied to a detector 18 which then produces an output voltage the magnitude of which varies in response to the oscillation frequency of the oscillator 15. The output of the detector 18 is connected to a comparator 19. This comparator 19 produces an output voltage corresponding to the difference between a reference frequency and that of the oscillator 15 and then supplies the same across the coil 6 of the movable mirror assembly 5.

In order to make the incident light beam on the reflective layer 4 of the recording medium 2 form a spiral trace on the recording surface of the recording medium 2 as the medium rotates, the first lens system 8 is moved radially with respect to the recording medium 2, and the second lens system 9, mirrors 11 to 13 and movable mirror assembly 5, for example, are moved along with the first lens system 8.

When the recording medium 2 is stopped and the distance between the reflective layer 4 of the recording medium 2 and the first lens system 8 becomes a certain value, the distance between the mirror 7 of the movable mirror assembly 5 and the second lens system 9 can be adjusted by the movable mirror assembly 5 so that the incident light beam through the first lens system 8 is just focused on the reflective layer 4 of the recording medium 2 as an image point $P_2$. This condition of the light beam can be always maintained on the recording surface of the recording medium 2 automatically by the following adjustment so that even though the recording medium 2 is vibrated up and down or the like and the position of the recording surface is changed by $\Delta h$, the position of the mirror 7 of the movable mirror assembly 5 is moved up and down by a distance $\Delta x$ (to be described later) in accordance with the changing distance $\Delta h$ of the position of the recording surface.

The moving distance $\Delta x$ for the mirror 7 of the moving mirror assembly 5 in response to the changing distance $\Delta h$ of the recording surface of the recording medium 2 is determined as follows in accordance with optical requirements illustrated in FIG. 2A.

FIG. 2A shows the recording surface of the recording medium 2 in a constant position and the image point $P_2$ focused on the recording surface. This means that the light beam is in the just focused condition. FIG. 2B shows the recording surface of the recording medium 2 in a location to which it moves when it is fluctuated by a distance $\Delta h$, but the mirror 7 is shown as being moved by a distance $\Delta x$ to make the image point $P_2$ appear just on the recording surface of the recording medium 2. In the case of FIGS. 2A and 2B, the incident lighht beam passed through the lens system 9 to the mirror 7 is focused in front of the mirror at a focus point $F_1$. The reflected light from the mirror 7 is again incident on the lens system 9 just as if it were light emitted from a point Q symetrically spaced from the focus point $F_1$ with respect to the mirror 7, and is focused at the intermediate image point $P_1$. From there the light beam diverges to the lens system 8, which then focuses the beam on the recording surface of the recording medium as the image point $P_2$.

If it is assumed that the optical path length between the lens system 9 and the point Q is taken as $a_1$, the optical path length between the lens system 9 and the image point $P_1$ as $b_1$, and the focal length of the lens system 9 as $f_1$, respectively, the following equation (1) is established:

$$(1/a_1) + (1/b_1) = (1/f_1) \tag{1}$$

If it is assumed that when the optical path length $a_1$ is changed by $\Delta a_1$, the optical path length $b_1$ is changed by $\Delta b_1$, the following equation (2) is obtained:

$$\frac{1}{a_1 + \Delta a_1} + \frac{1}{b_1 + \Delta b_1} = \frac{1}{f_1} \tag{2}$$

From the equations (1) and (2) the following equation (3) is derived:

$$\Delta b_1 = \frac{\Delta a_1 \cdot f_1^2}{(a_1 - f_1)(f_1 - a_1 - \Delta a_1)} \tag{3}$$

Since the magnification $N_1$ of the lens system 9 is $$\frac{b_1}{a_1} \left( N_1 = \frac{b_1}{a_1} \right),$$

the equation (1) can be rewritten as follows:

$$a_1 - f_1 = (f_1/N_1) \tag{4}$$

From the equations (3) and (4) the following equation (5) is obtained:

$$\Delta b_1 = -\frac{N_1^2 \cdot f_1 \cdot \Delta a_1}{f_1 + N_1 \cdot \Delta a_1} \tag{5}$$

Similarly, if it is assumed that the optical path length between the lens system 8 and the image point $P_1$ is taken as $a_2$, that between the lens system 8 and the image point $P_2$ as $b_2$, the focal length of the lens system 8 as $f_{22}$, changes of the optical path lengths $a_2$ and $b_2$ as $\Delta a_2$ and $\Delta b_2$, and the magnification of the lens system 8 as $N_2$, the change $\Delta b_2$ can be expressed as follows:

$$\Delta b_2 = -\frac{N_2^2 \cdot f_2 \cdot \Delta a_2}{f_2 + N_2 \cdot \Delta a_2} \tag{6}$$

As may be apparent from FIGS. 2A and 2B, by making $\Delta b_1 = -\Delta a_2$ and substituting this value into the equation (5), the following equation (7) is obtained:

$$\Delta a_2 = \frac{N_1^2 \cdot f_1 \cdot \Delta a_1}{f_1 + N_1 \cdot \Delta a_1} \tag{7}$$

If the equation (7) is substituted into the equation (6), the change $\Delta b_2$ is expressed as follows:

$$\Delta b_2 = -\frac{N_1^2 \cdot N_2^2 \cdot f_1 \cdot f_2 \cdot \Delta a_1}{N_1(f_2 + N_1 \cdot N_2 \cdot f_1)\Delta a_1 + f_1 \cdot f_2} \tag{8}$$

As may be apparent from FIGS. 2A and 2B, between the incremental movement $\Delta x$ of the mirror 7 of the movable mirror assembly 5 and the incremental movement $\Delta a_1$ there is the relation of $\Delta a_1 = 2\Delta x$ and the fluctuating amount $\Delta h$ of the recording surface of the recording medium 2 is equal to $\Delta b_2$, that is, $\Delta h = \Delta b_2$, so that from the equation (8) the distance $\Delta x$ for moving the mirror 7 of the movable mirror assembly 5 in response to the fluctuation $\Delta h$ of the recording surface is expressed as follows:

$$\Delta x = -\frac{f_1 \cdot f_2 \cdot \Delta h/2}{N_1(f_2 + N_1 \cdot N_2 \cdot f_1)\Delta h + N_1^2 \cdot N_2^2 \cdot f_1 \cdot f_2} \tag{9}$$

Accordingly, if the frequency of the oscillator 15 is varied with the change of the capacity C established between the electrode 16 and the ground, which corresponds to the fluctuation $\Delta h$ of the surface of the recording medium 2, to satisfy the equation (9), the just focused condition of the light beam can be always maintained on the recording surface of the recording medium 2 even though the location of the recording surface fluctuates up and down.

The above description is given for the case in which the just focused condition of light beam can be always maintained on the recording surface of the recording medium, but if a somewhat under- or over-focused condition of light beam is preferred upon reproduction to the just focused condition, it will be easily understood that this invention makes it possible to maintain such an under- or over-focused condition on the recording surface.

In accordance with the system of the present invention the lens system opposing the recording surface of the recording medium is not moved but the mirror 7, which is lighter than the lens system is moved. Thus, fluctuations of the recording surface with respect to the lens system may be followed more precisely and a desired focus condition of light beam can be always obtained on the recording surface, automatically.

Further, in accordance with the present invention, it is sufficient that the mirror be mounted on a device which can be vibrated up and down, so that the moving member can be simplified in construction as compared with a device for moving the lens system.

The above description is given for the case in which the present invention is employed to reproduce a previously recorded signal, but it will be easily understood that the invention can be employed for obtaining a desired focused condition for the case in which video signal is recorded as a pit on the recording surface of a recording medium. In that case, a device such as Pockels cell can be used for modulating a laser light beam in accordance with a signal to be recorded.

It will be also apparent that the invention is not limited to recording or reproducing a video signal but can be employed to record or reproduce a sound signal and so on.

It will be understood that many modifications and variations could be effected by one skilled in the art without departing from the true scope of the invention, so that the scope of the invention should be determined by the following claims.

I claim as my invention:

1. A focus control system for an optical record carrier having a reflective surface, said system comprising:
   a. a light beam source;
   b. first lens means disposed facing said reflective surface and spaced therefrom along a first optical path section for focusing a light beam from said light beam from source on said reflective surface;
   c. a movable mirror;
   d. second lens means disposed facing said movable mirror and spaced therefrom along a second optical path section;
   e. means for directing an incident light beam from said light beam source onto said movable mirror through said second lens means;
   f. means for directing a light beam reflected from said movable mirror through said second lens means to said reflective surface of said carrier through said first lens means; and
   g. means for driving said movable mirror so that the distance between said movable mirror and said second lens means along said second optical path section is controlled in response to the distance between said reflective surface of said carrier and said first lens means along said first optical path section, whereby said directed light beam to said reflective surface remains focused on said reflective surface in spite of fluctuations of said reflective surface.

2. A focus control system in accordance with claim 1, in which said means for directing an incident light beam onto said movable mirror comprises a semi-transparent mirror.

3. A focus control system in accordance with claim 1 further comprising a photo-detector to receive a light beam reflected from said reflective surface for developing an output signal representing information stored in said carrier, 4. A focus control system in accordance with claim 3, in which said means for directing a light beam reflected from said movable mirror to said reflective surface comprises a semi-transparent mirror.

5. A focus control system in accordance with claim 1 further comprising a photo-modulator to modulate said incident light beam in response to an input signal to be stored in said carrier.

6. A focus control system in accordance with claim 5, in which said means for directing an incident light beam onto said movable mirror includes a semi-transparent mirror.

7. A focus control system in accordance with claim 1, in which said second lens means converges said incident light beam from said source to a point focus at a point located on said second optical section between said light beam source and said movable mirror.

8. A focus control system in accordance with claim 7, in which said means for directing said indicent light beam onto said movable mirror comprises a semi-transparent mirror on said optical path section between said light beam source and said point.

9. A focus control system in accordance with claim 1, in which said second lens means converges said light beam reflected from said mirror to a point focus at a point located on a third optical path section between said first and second lens means.

10. A focus control system in accordance with claim 9, in which said means for directing an incident light beam onto said movable mirror comprises a semi-transparent mirror, said second and third optical path sections being coincident between said movable mirror and said semi-transparent mirror and being perpendicular to said movable mirror.

11. A focus control system in accordance with claim 9, in which said first, second, and third optical path sections are coincident with each other along a portion of their respective lengths to constitute a main optical path, the distance along said main optical path between said movable mirror and said second lens means being changed by a distance $x$ to keep said directed light beam focused on said reflective surface when the distance along said main optical path between said reflective surface and said first lens means is changed by distance $h$ where $$x = - \frac{f_1 \cdot f_2 \cdot \Delta h/2}{N_1(f_2 + N_1 \cdot N_2 \cdot f_1)\Delta h + N_1^2 \cdot N_2^2 \cdot f_1 \cdot f_2}$$

and $f_1$ is focal length of said second lens means, $f_2$ is the focal length of said first lens means, $N_1$ is the magnification of said second lens means, and $N_2$ is the magnification of said first lens means.

12. A focus control system in accordance with claim 11, in which said means for directing an incident light beam onto said movable mirror comprises a first semi-transparent mirror, said main optical path intercepting said first semi-transparent mirror between said movable mirror and said point, said system further comprising a second semi-transparent mirror on said main optical path between said point and said first lens means.

* * * * *